US012340514B2

(12) United States Patent
Tsai et al.

(10) Patent No.: US 12,340,514 B2
(45) Date of Patent: Jun. 24, 2025

(54) RUT DETECTION FOR ROAD INFRASTRUCTURE

(71) Applicant: NEC Laboratories America, Inc., Princeton, NJ (US)

(72) Inventors: Yi-Hsuan Tsai, Santa Clara, CA (US); Sparsh Garg, San Jose, CA (US); Manmohan Chandraker, Santa Clara, CA (US); Samuel Shulter, New York, NY (US); Vijay Kumar Baikampady Gopalkrishna, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 499 days.

(21) Appl. No.: 17/903,383

(22) Filed: Sep. 6, 2022

(65) Prior Publication Data
US 2023/0073055 A1 Mar. 9, 2023

Related U.S. Application Data

(60) Provisional application No. 63/242,062, filed on Sep. 9, 2021.

(51) Int. Cl.
*G06T 7/11* (2017.01)
(52) U.S. Cl.
CPC ...... *G06T 7/11* (2017.01); *G06T 2207/20084* (2013.01); *G06T 2207/30261* (2013.01)

(58) Field of Classification Search
CPC .............. G06V 20/588; G06T 7/11; G06T 2207/30184; G06T 2207/30256
See application file for complete search history.

(56) References Cited

FOREIGN PATENT DOCUMENTS

CN 103778634 * 5/2014 ............... G06T 7/00

OTHER PUBLICATIONS

Krizhevsky A, Sutskever I, Hinton GE. Imagenet classification with deep convolutional neural networks. Communications of the ACM. May 24, 2017;60(6):84-90.

* cited by examiner

*Primary Examiner* — Sam Bhattacharya
(74) *Attorney, Agent, or Firm* — Joseph Kolodka (57) ABSTRACT

A computer-implemented method for rut detection is provided. The method includes detecting, by a rut detection system, areas in a road-scene image that include ruts with pixel-wise probability values, wherein a higher value indicates a better chance of being a rut. The method further includes performing at least one of rut repair and vehicle rut avoidance responsive to the pixel-wise probability values. The detecting step includes performing neural network-based, pixel-wise semantic segmentation with context information on the road-scene image to distinguish rut pixels from non-rut pixels on a road depicted in the road-scene image.

20 Claims, 8 Drawing Sheets

RUT DETECTION FOR ROAD INFRASTRUCTURE

RELATED APPLICATION INFORMATION

This application claims priority to 63/242,062, filed on Sep. 9, 2021, incorporated herein by reference in its entirety.

BACKGROUND

Technical Field

The present invention relates to road infrastructure and more particularly to rut detection for road infrastructure.

Description of the Related Art

Road infrastructure is critical for the public in daily usages, and thus its maintenance is especially important to keep the regular functionality. Among this, the condition of road can directly affect many people when driving the car, but it is inevitable that road damage can be caused due to the huge pressure from tires rolling on the same path every day, which will result in severe ruts on roads.

To enable timely maintenance on roads, it is crucial to develop an automatic algorithm that can robustly tell whether the road includes ruts. However, ruts are usually subtle visual differences from other parts of the road. Thus, treating this problem as an image classification task is difficult to satisfy the need of training a good rut detection model.

SUMMARY

According to aspects of the present invention, a computer-implemented method for rut detection is provided. The method includes detecting, by a rut detection system, areas in a road-scene image that include ruts with pixel-wise probability values, wherein a higher value indicates a better chance of being a rut. The method further includes performing at least one of rut repair and vehicle rut avoidance responsive to the pixel-wise probability values. The detecting step includes performing neural network-based, pixel-wise semantic segmentation with context information on the road-scene image to distinguish rut pixels from non-rut pixels on a road depicted in the road-scene image.

According to other aspects of the present invention, a computer program product for rut detection is provided. The computer program product includes a non-transitory computer readable storage medium having program instructions embodied therewith. The program instructions are executable by a computer to cause the computer to perform a method. The method includes detecting, by a rut detection system, areas in a road-scene image that include ruts with pixel-wise probability values, wherein a higher value indicates a better chance of being a rut. The method further includes performing at least one of rut repair and vehicle rut avoidance responsive to the pixel-wise probability values. The detecting step includes performing neural network-based, pixel-wise semantic segmentation with context information on the road-scene image to distinguish rut pixels from non-rut pixels on a road depicted in the road-scene image.

According to yet other aspects of the present invention, a rut detection and repair system is provided. The system includes a camera for capturing a road-scene image. The system further includes a memory device for storing program code therein. The system also includes a processor device operatively coupled to the memory device for running the program code to detect areas in the road-scene image that include ruts with pixel-wise probability values, wherein a higher value indicates a better chance of being a rut. The processor device further runs the program code to control one or more physical machines performing rut repair responsive to the pixel-wise probability values. The processor device detects areas in the road-scene image by performing neural network-based, pixel-wise semantic segmentation with context information on the road-scene image to distinguish rut pixels from non-rut pixels on a road depicted in the road-scene image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to rut detection for road infrastructure.

Instead of considering this task as a conventional classification problem (i.e., rut versus background), a more fine-grained recognition task (i.e., rut versus other parts on road versus background) is used. Moreover, since ruts are always on the road and usually appear in certain locations where the tires roll on, using some spatial context information is also a useful cue for identifying ruts.

Since roads are everywhere, it is significantly time-consuming to inspect with the human eye whether ruts exist on roads or not. Therefore, with the developed automatic algorithm to detect ruts, there can be various applications to help road maintenance as well as vehicle avoidance of ruts. First, given a road-scene image, the method of the present invention can detect the areas that include ruts with pixel-wise probability values (a higher value means a better chance being the rut). Hence, the algorithm of the present invention can judge whether the rut condition is severe, which needs immediate maintenance and/or vehicle avoidance. Moreover, if the data is a video sequence, our model can determine how much portion of ruts appear in the video, so that the system can determine whether this road needs maintenance.

Figure 1:
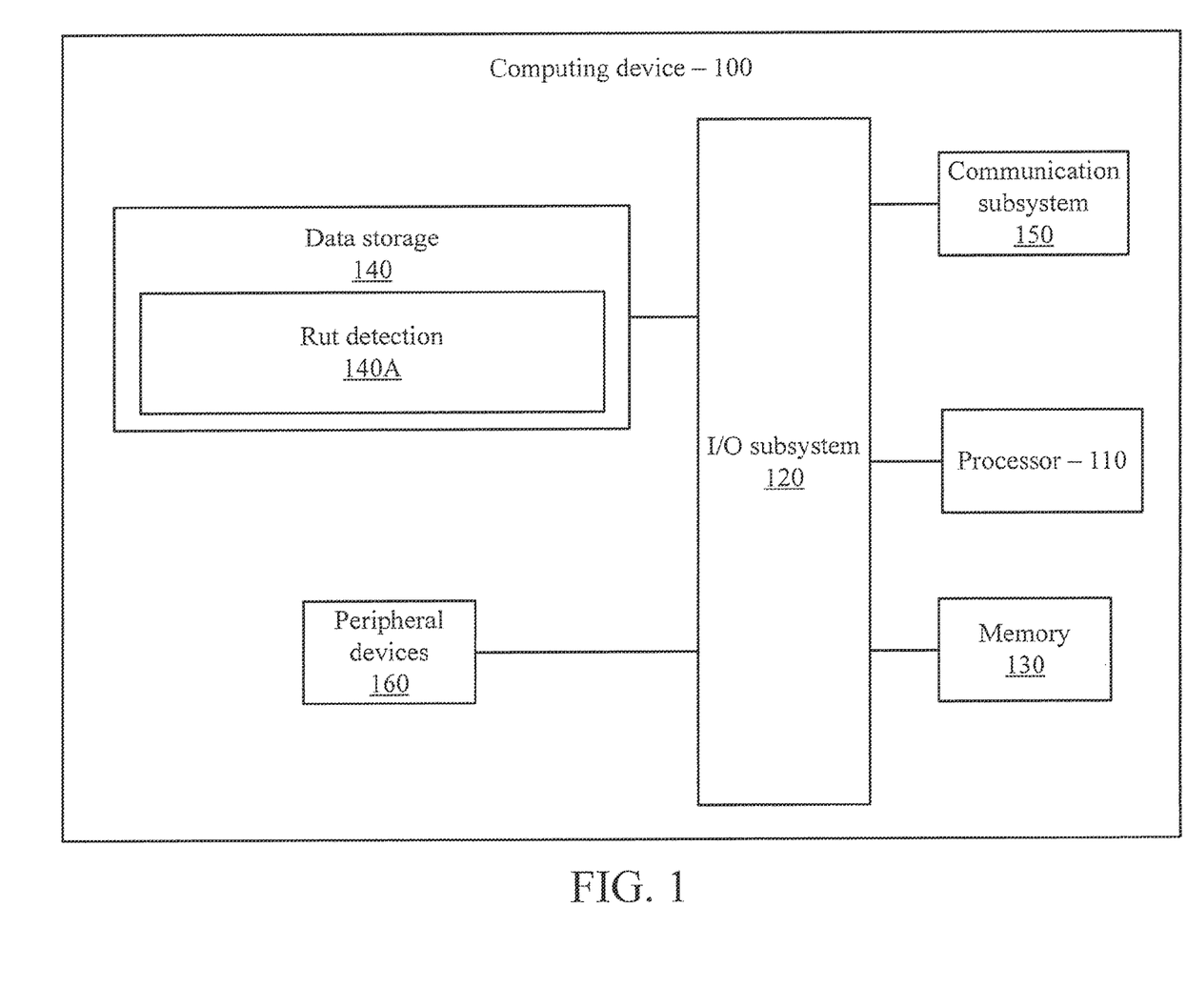
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform rut detection.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for rut detection. The program code for rut detection can include an Advanced Driver Assistance System (ADAS) and/or can be coupled to an ADAS. Moreover, the program code can be operatively provided to a rut repair device part of a rut detection vehicle and/or a rut repair vehicle in order to detect and then repair a detected rut. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a camera, display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
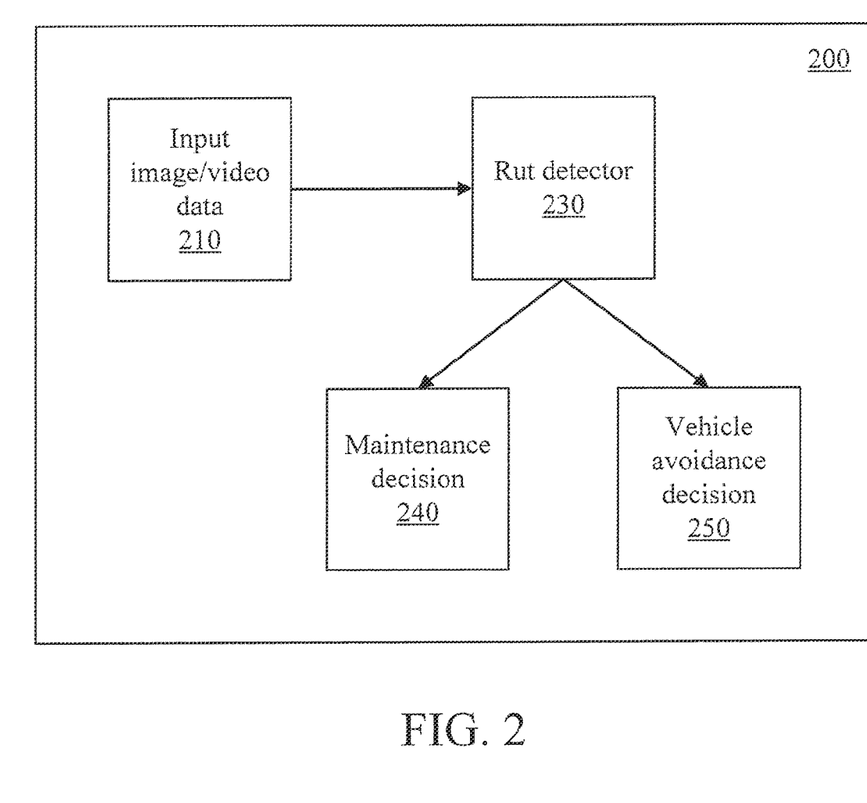
FIG. 2 is a diagram showing an exemplary system for road rut detection, in accordance with an embodiment of the present invention.

These and other variations of a hardware processor subsystem are also contemplated in accordance with embodiments of the present invention FIG. 2 is a diagram showing an exemplary system 200 for road rut detection, in accordance with an embodiment of the present invention.

The system 200 receives image/video data 210 captured by a camera, a rut detector 230, a maintenance decision 240, a vehicle avoidance decision 250.

As is evident, the decisions result in different actions being performed. For example, for a maintenance decision 240, the decision determines whether the road needs to be immediately repaired and can further dispatch a vehicle to repair the rut. The dispatched vehicle can be an autonomous vehicle or a vehicle in wireless communication with a rut detecting vehicle that provides rut information (location, size, etc.) to the rut repairing vehicle. Regarding the vehicle avoidance decision 250, the same can be implemented by a vehicle in order to control the vehicle to avoid the rut or at the least minimize damage from striking the rut. In such cases, steering around the rut, or braking or decreasing the speed at which the rut is hit and/or other actions can be taken.

The rut detector 230 detects runs from the image/video data 210, and the decision elements 240 and 250 render their decisions based on the output of the rut detector.

Figure 3:
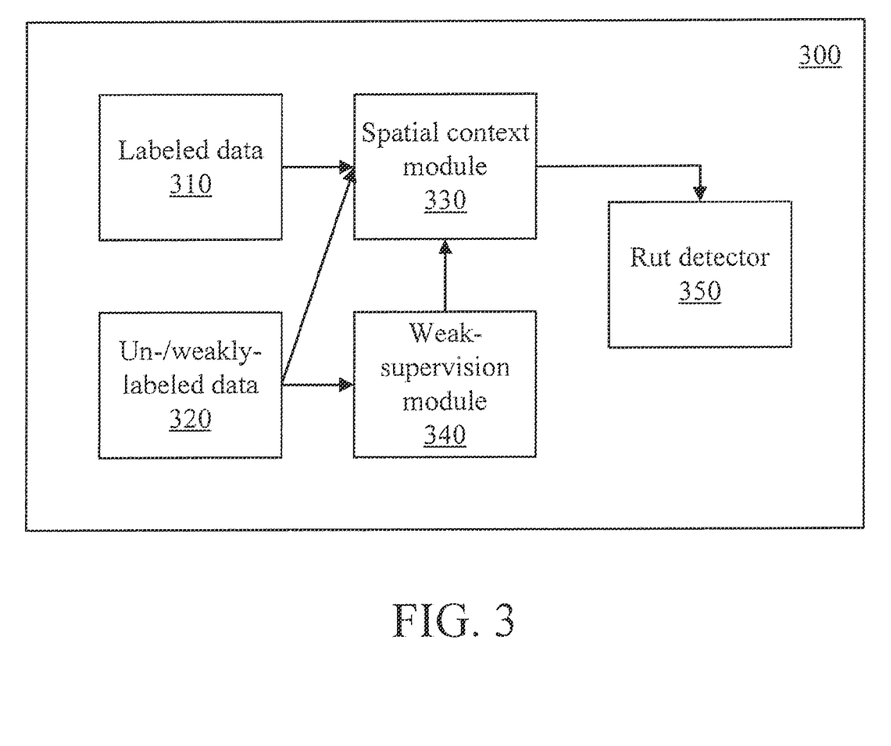
FIG. 3 is a diagram showing an exemplary training phase, in accordance with an embodiment of the present invention.

FIG. 3 is a diagram showing an exemplary training phase 300, in accordance with an embodiment of the present invention.

The training phase 300 involves labeled data 310 and un-/weakly-labeled data 320, a spatial contextual module 330, a weak supervision module 340, and a rut detector 350.

Figure 4:
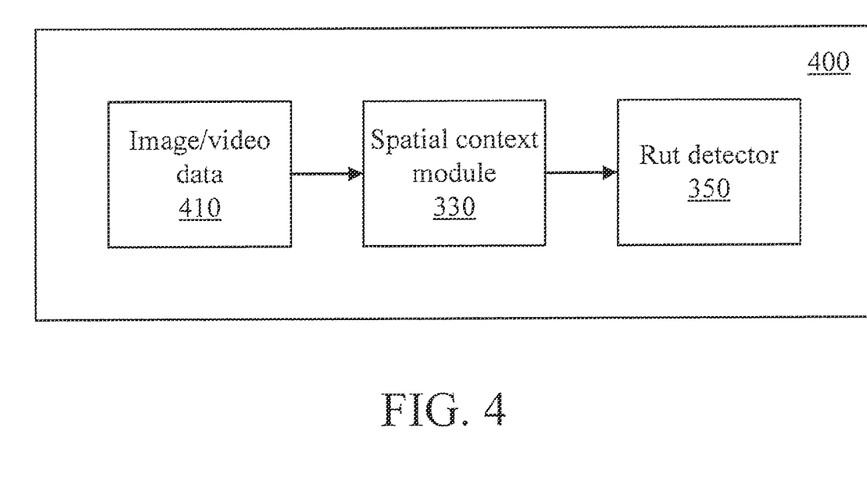
FIG. 4 is a diagram showing an exemplary testing phase, in accordance with an embodiment of the present invention.

FIG. 4 is a diagram showing an exemplary testing phase 400, in accordance with an embodiment of the present invention.

The testing phase 400 involves image/video data 410, the spatial contextual module 330, and the rut detector 350.

Instead of considering rut detection as a standard image classification task, the present invention treats it as a fine-grained pixel-wise semantic segmentation problem. Besides predicting the rut category for each pixel, the present invention predicts additional context categories like road, car, lanes, etc. Since cracks in the road are often ambiguous with ruts, we also add cracks as a context category.

Training this segmentation model requires pixel-wise ground truth, which is time-consuming to collect. It is thus proposed to leverage an off-the-shelf semantic segmentation model and use its predictions as pseudo ground truths that act as general context information (spatial-contextual module 330 in FIGS. 3 and 4). The present invention combines the pseudo ground truth with annotations for ruts (and cracks), which are the only two categories requiring human annotations.

To further limit annotation costs, the present invention provides an element (weak-supervision module 340 in FIG. 3) that handles unlabeled data or data with weak annotations, e.g., image-wise labels (instead of pixel-wise).

The key differentiator to prior work is that the present invention treats the problem of detecting ruts in roads as a pixel-wise segmentation problem rather than an image-based classification problem. Conventional methods for rut detection rely on deep neural networks as an image classification task, in which the objective is to classify whether an image includes a rut or not. However, since ruts are very similar to other pixels on the road, only using the classification network to identify ruts is not robust. Moreover, classification networks only consider the global information without leveraging the spatial context information, which is an important cue for rut detection. In contrast, embodiments of the present invention provide a method to discover ruts by utilizing pixel-wise semantic segmentation with the context information, which can distinguish detailed differences between ruts and other pixels on the road.

Another novel aspect of the present invention is how the segmentation model is trained with little additional human supervision. The present invention leverages (a) a universal semantic segmentation model to provide pseudo labels for semantic context classes (like road, sky, lane marking, etc.) and (b) a weak-supervision module that can train the segmentation model with no or with weak annotation (in the form of image-level annotation of "rut" versus "no rut").

Figure 5:
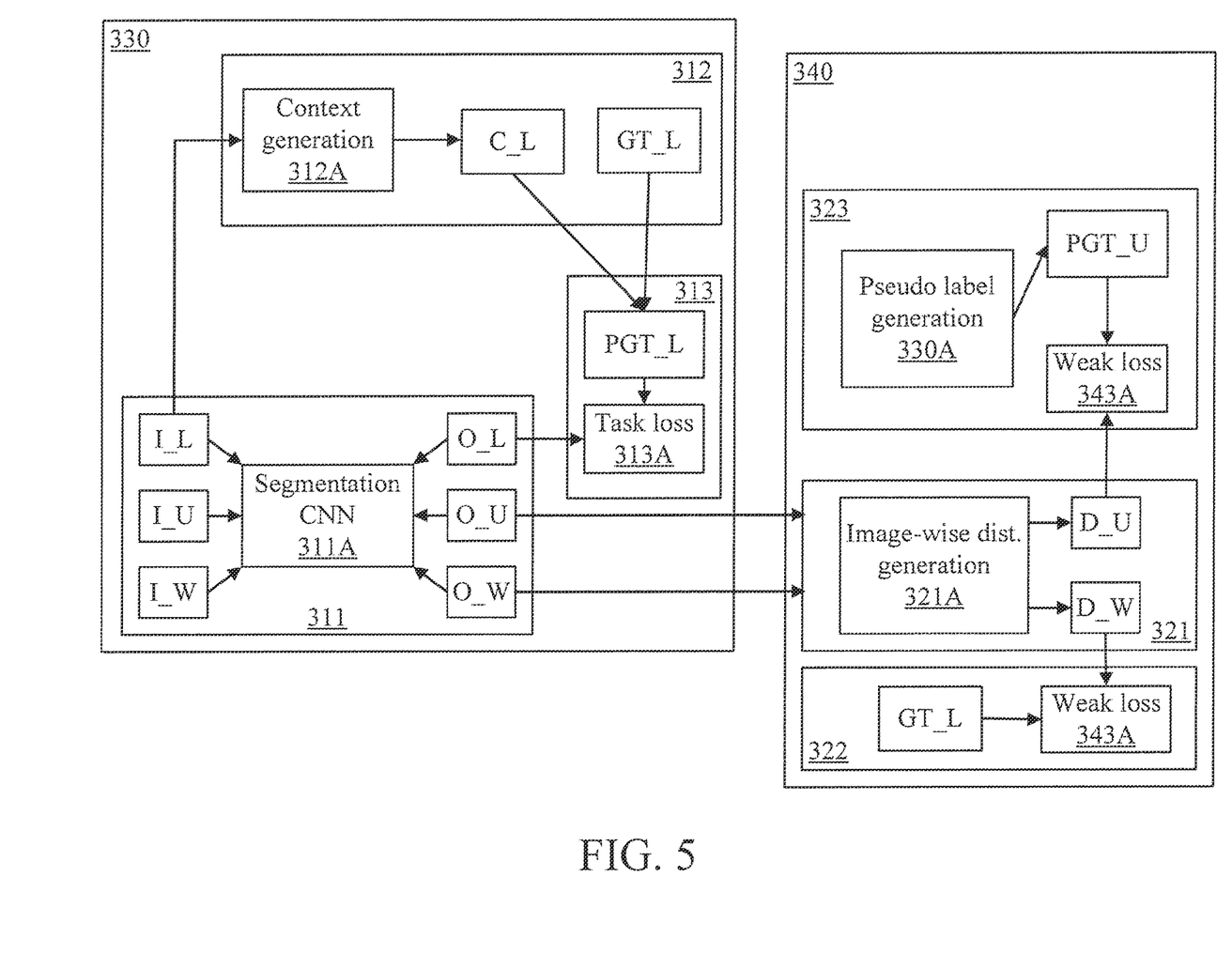
FIG. 5 is a high-level block diagram showing an exemplary spatial-contextual module and a weak-supervision module, in accordance with an embodiment of the present invention.

FIG. 5 is a high-level block diagram showing an exemplary spatial-contextual module 330 and a weak-supervision module 340, in accordance with an embodiment of the present invention.

A description will now be given regarding the spatial-contextual module 330.

To that end, it is noted that the spatial-contextual module 330 includes a main task segmentation convolutional neural network (CNN) 331.

The input images 310/410 can come from the labeled image I_L (pixel-wise rut annotations), unlabeled image I_U, or weakly-labeled image I_W (image-wise rut annotations). These inputs are fed into the segmentation CNN 311A of a segmentation block 311 to generate the outputs for individual input formats, i.e., O_L, O_U, and O_W.

In block 312, given the labeled I_L, the present invention generates 312A its pixel-wise context information C_L by using an off-the-shelf semantic segmentation model. By combining the pixel-wise rut annotations GT_L, the present invention can assemble a pixel-wise pseudo ground truth PGT_L (in block 313) that includes both rut and context information. This block transforms the image-level rut detection to out proposed pixel-wise rut detection with contextual information.

The spatial-contextual module 330 further includes a main task loss function 330A.

In block 313, by assembling the pixel-wise context information C_L and annotated ruts GT_L from block 312, the present invention generates the pixel-wise pseudo ground truth PGT_L, which is then used as the supervision to optimize the task loss 313A for pixel-wise rut detection, with respect to the segmentation output O_L from block 311.

A description will now be given regarding the weak-supervision module 340.

For weakly-labeled and unlabeled data, since there are no pixel-wise ground truths, the present invention generates, using an image-wise distributions generator 341, the image-wise distributions (D_U and D_W) from their segmentation outputs (O_U and O_W from block 331) for further usage in block 342 and 343 by weak loss modules 342A and 343A.

In block 322, by using the image-wise rut ground truths GT W, the present invention calculates a weak loss 322A for image classification, with respect to the image-wise distribution D_W generated from block 321.

In block 323, for unlabeled data, since there are also no image-wise annotations, the present invention first generates pseudo image-wise rut labels PGT_U from D_U. Then, similar to block 322, the present invention adopts a weak loss 323A for image classification, with respect to the image-wise distribution D_U generated from block 221.

Figure 6:
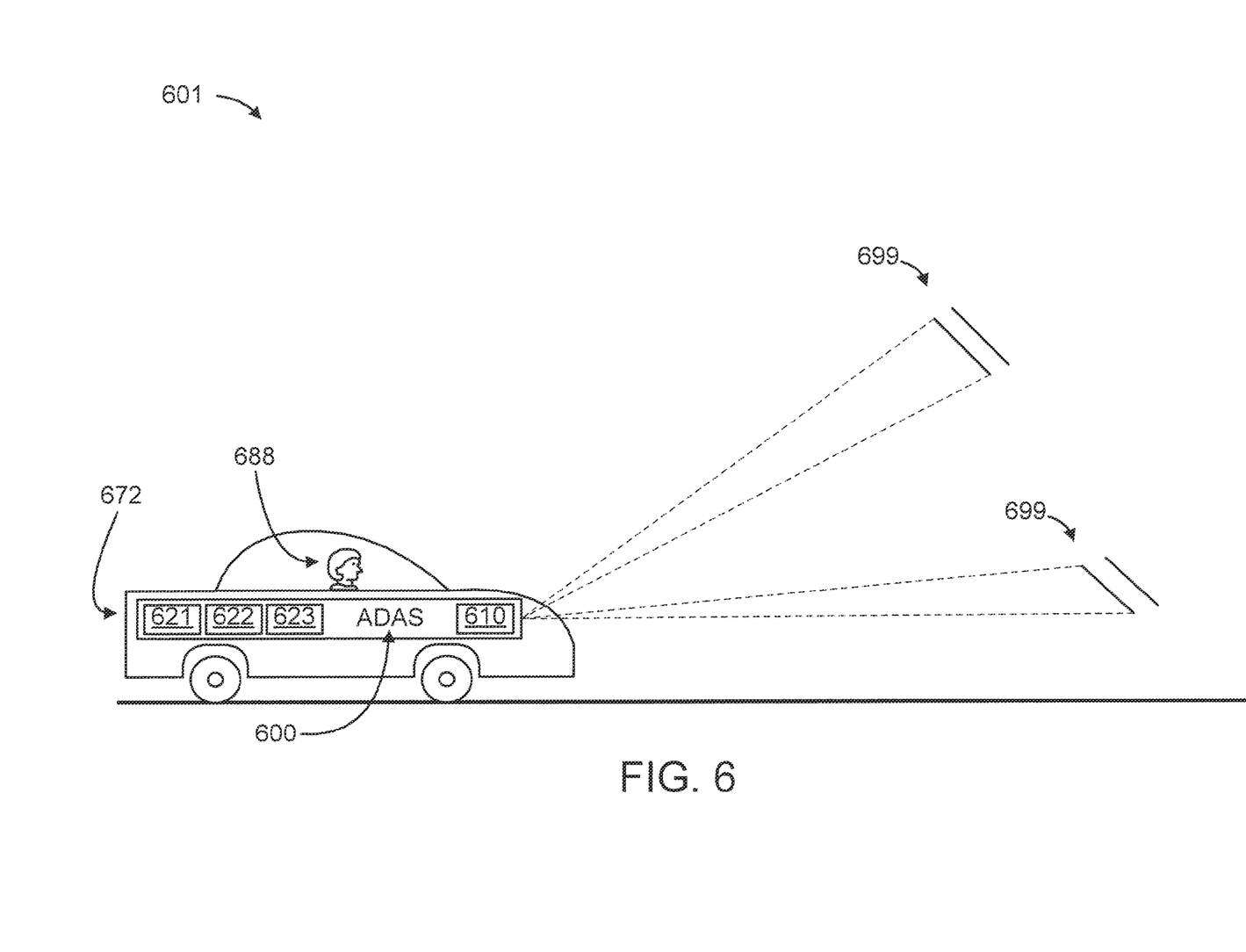
FIG. 6 is a diagram showing an exemplary Advanced Driver Assistance System, in accordance with an embodiment of the present invention.

FIG. 6 is a diagram showing an exemplary Advanced Driver Assistance System 600, in accordance with an embodiment of the present invention.

The ADAS 600 is used in an environment 601 wherein a user 688 is located in a scene with ruts 699, each having their own locations and trajectories. The user 688 is operating a vehicle 672 (e.g., a car, a truck, a motorcycle, etc.).

The ADAS 600 includes a camera system 610. While a single camera system 610 is shown in FIG. 6 for the sakes of illustration and brevity, it is to be appreciated that multiple camera systems can be also used, while maintaining the spirit of the present invention. The ADAS 600 further includes a server 620 configured to perform rut detection. The server 620 can include a processor 621, a memory 622, and a wireless transceiver 623. The processor 621 and the memory 622 of the remote server 620 can be configured to perform driver assistance functions based on predictions made from images received from the camera system 610 by the (the wireless transceiver 623 of) the remote server 620.

The ADAS 600 can interface with the user through one or more systems of the vehicle 672 that the user is operating. For example, the ADAS 600 can provide the user information (e.g., detected ruts 699, their locations 699B, suggested actions, etc.) through a system 672A (e.g., a display system, a speaker system, and/or some other system) of the vehicle 672. Moreover, the ADAS 600 can interface with the vehicle 672 itself (e.g., through one or more systems of the vehicle 672 including, but not limited to, a steering system, a braking system, an acceleration system, stability, a steering system, etc.) in order to control the vehicle or cause the vehicle 672 to perform one or more actions. In this way, the user or the vehicle 672 itself can navigate around these ruts 699 to avoid traversing the ruts and potentially losing control of the vehicle.

Figure 7:
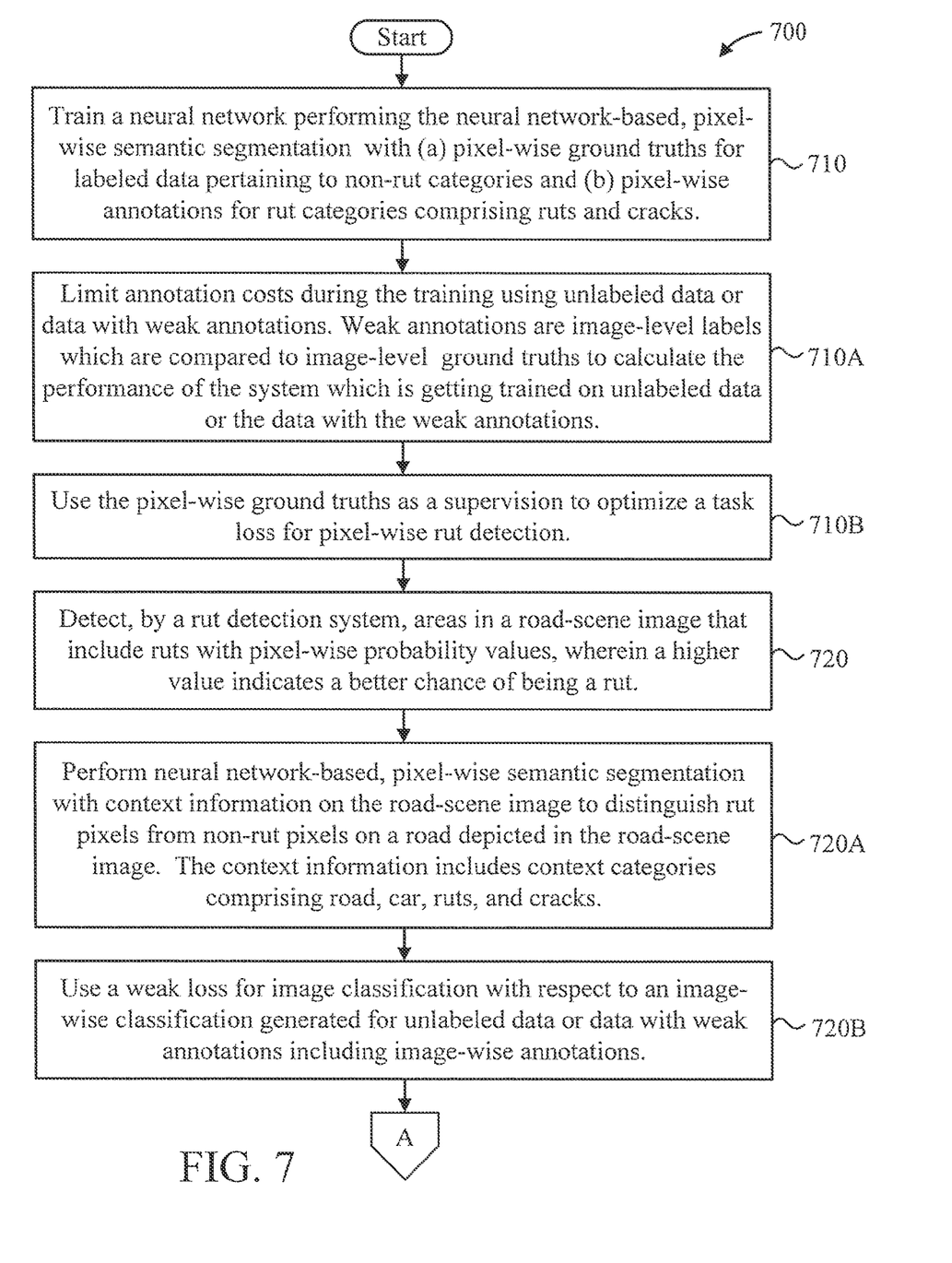
FIGS. 7-8 show an exemplary method for rut detection and repair/avoidance, in accordance with an embodiment of the present invention.
Figure 8:
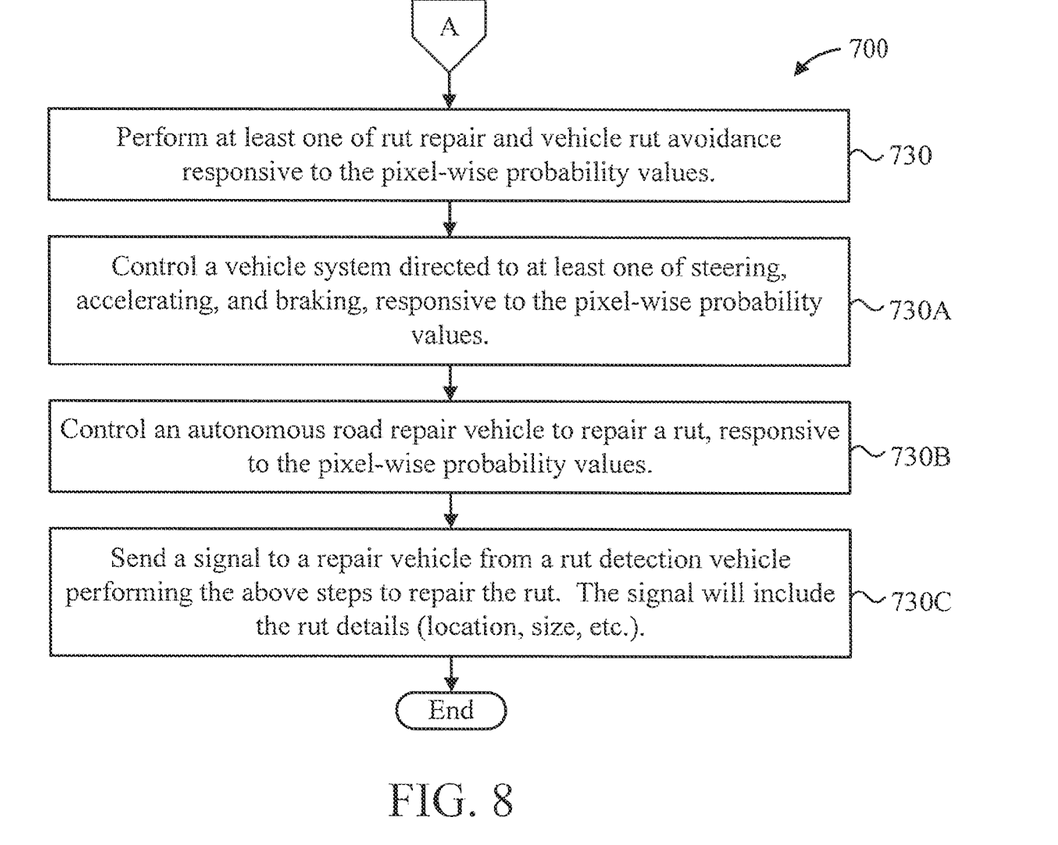

FIGS. 7-8 show an exemplary method 700 for rut detection and repair/avoidance, in accordance with an embodiment of the present invention.

At block 710, train a neural network performing the neural network-based, pixel-wise semantic segmentation with (a) pixel-wise ground truths for labeled data pertaining to non-rut categories and (b) pixel-wise annotations for rut categories comprising ruts and cracks.

In an embodiment, block 710 can include one or more of blocks 710A through 710B.

At block 710A, limit annotation costs during the training using unlabeled data or data with weak annotations. Weak annotations are image-level labels which are compared to image-level ground truths (binary annotation whether it has rut or no rut) to calculate the performance of the system which is getting trained on unlabeled data or the data with the weak annotations.

At block 710B, use the pixel-wise ground truths as a supervision to optimize a task loss for pixel-wise rut detection.

At block 720, detect, by a rut detection system, areas in a road-scene image that include ruts with pixel-wise probability values, wherein a higher value indicates a better chance of being a rut.

In an embodiment, block 720 includes one or more of blocks 720A through 720B.

At block 720A, perform neural network-based, pixel-wise semantic segmentation with context information on the road-scene image to distinguish rut pixels from non-rut pixels on a road depicted in the road-scene image. The context information includes context categories comprising road, car, ruts, and cracks. A rut usually has a bump while a crack involves missing material and a gap.

At block 720B, use a weak loss for image classification with respect to an image-wise classification generated for unlabeled data or data with weak annotations including image-wise annotations.

At block 730, perform at least one of rut repair and vehicle rut avoidance responsive to the pixel-wise probability values.

In an embodiment, block 730 can include one or more of blocks 730A through 730C.

At block 730A, control a vehicle system directed to at least one of steering, accelerating, and braking, responsive to the pixel-wise probability values.

At block 730B, control an autonomous road repair vehicle to repair a rut, responsive to the pixel-wise probability values.

At block 730C, send a signal to a repair vehicle from a rut detection vehicle performing the above steps to repair the rut. The signal will include the rut details (location, size, etc.).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for rut detection, comprising:
    detecting, by a rut detection system, areas in a road-scene image that include ruts with pixel-wise probability values, wherein a higher value indicates a better chance of being a rut; and performing at least one of rut repair and vehicle rut avoidance responsive to the pixel-wise probability values, wherein said detecting step comprises performing neural network-based, pixel-wise semantic segmentation with context information on the road-scene image to distinguish rut pixels from non-rut pixels on a road depicted in the road-scene image.

2. The computer-implemented method of claim 1, wherein the context information includes context categories comprising road, car, ruts, and cracks.

3. The computer-implemented method of claim 1, further comprising training a neural network performing the neural network-based, pixel-wise semantic segmentation with (a) pixel-wise ground truths for labeled data pertaining to non-rut categories and (b) pixel-wise annotations for rut categories comprising ruts and cracks.

4. The computer-implemented method of claim 3, further comprising limiting annotation costs during the training using unlabeled data or data with weak annotations, the weak annotations being image-wise labels compared to image-wise ground truths for the unlabeled data or the data with the weak annotations.

5. The computer-implemented method of claim 3, wherein the training comprises using the pixel-wise ground truths as a supervision to optimize a task loss for pixel-wise rut detection.

6. The computer-implemented method of claim 1, wherein the neural network-based, pixel-wise semantic segmentation comprises a segmentation convolutional neural network.

7. The computer-implemented method of claim 1, wherein said detecting step uses a weak loss for image classification with respect to an image-wise classification generated for unlabeled data or data with weak annotations comprising image-wise annotations.

8. The computer-implemented method of claim 1, wherein the vehicle rut avoidance involves controlling a vehicle system directed to at least one of steering, accelerating, and braking, responsive to the pixel-wise probability values.

9. A computer program product for rut detection, the computer program product comprising a non-transitory computer readable storage medium having program instructions embodied therewith, the program instructions executable by a computer to cause the computer to perform a method comprising:

detecting, by a rut detection system, areas in a road-scene image that include ruts with pixel-wise probability values, wherein a higher value indicates a better chance of being a rut; and performing at least one of rut repair and vehicle rut avoidance responsive to the pixel-wise probability values, wherein said detecting step comprises performing neural network-based, pixel-wise semantic segmentation with context information on the road-scene image to distinguish rut pixels from non-rut pixels on a road depicted in the road-scene image.

10. The computer program product of claim 9, wherein the context information includes context categories comprising road, car, ruts, and cracks.

11. The computer program product of claim 9, further comprising training a neural network performing the neural network-based, pixel-wise semantic segmentation with (a) pixel-wise ground truths for labeled data pertaining to non-rut categories and (b) pixel-wise annotations for rut categories comprising ruts and cracks.

12. The computer program product of claim 11, further comprising limiting annotation costs during the training using unlabeled data or data with weak annotations, the weak annotations being image-wise labels compared to image-wise ground truths for the unlabeled data or the data with the weak annotations.

13. The computer program product of claim 11, wherein the training comprises using the pixel-wise ground truths as a supervision to optimize a task loss for pixel-wise rut detection.

14. The computer program product of claim 9, wherein the neural network-based, pixel-wise semantic segmentation comprises a segmentation convolutional neural network.

15. The computer program product of claim 9, wherein said detecting step uses a weak loss for image classification with respect to an image-wise classification generated for unlabeled data or data with weak annotations comprising image-wise annotations.

16. The computer program product of claim 9, wherein the vehicle rut avoidance involves controlling a vehicle system directed to at least one of steering, accelerating, and braking, responsive to the pixel-wise probability values.

17. A rut detection and repair system, comprising:

a camera for capturing a road-scene image;

a memory device for storing program code therein;

a processor device operatively coupled to the memory device for running the program code to detect areas in the road-scene image that include ruts with pixel-wise probability values, wherein a higher value indicates a better chance of being a rut; and control one or more physical machines performing rut repair responsive to the pixel-wise probability values, wherein the processor device detects areas in the road-scene image by performing neural network-based, pixel-wise semantic segmentation with context information on the road-scene image to distinguish rut pixels from non-rut pixels on a road depicted in the road-scene image.

18. The rut detection and repair system of claim 17, wherein the context information includes context categories comprising road, car, ruts, and cracks.

19. The rut detection and repair system of claim 17, wherein the processor device further runs the program code to train a neural network performing the neural network-based, pixel-wise semantic segmentation with (a) pixel-wise ground truths for labeled data pertaining to non-rut categories and (b) pixel-wise annotations for rut categories comprising ruts and cracks.

20. The rut detection and repair system of claim 19, wherein the processor device further runs the program code to limit annotation costs during the training using unlabeled data or data with weak annotations, the weak annotations being image-wise labels compared to image-wise ground truths for the unlabeled data or the data with the weak annotations.

* * * * *